(12) United States Patent
Clark et al.

(10) Patent No.: US 7,892,302 B2
(45) Date of Patent: Feb. 22, 2011

(54) BRIQUETTING PROCESS

(75) Inventors: Keith Norman Clark, Kenthurst (AU); George William Kalb, Wheeling, WV (US); Richard Komarek, Elk Grove Village, IL (US); Ross Lawrence Meakins, Bankstown (AU); Arthur Clive Pearson, Bunbury (AU)

(73) Assignees: Commonwealth Scientific and Industrial Research Organisation, Campbell (AU); Tra-Det Inc., Triadelphia, WV (US); K. R. Komarek Inc., Elk Grove Village, IL (US); The Griffin Coal Mining Company Pty Limited, Perth (AU)

( * ) Notice: Subject to any disclaimer, the term of this patent is extended or adjusted under 35 U.S.C. 154(b) by 1248 days.

(21) Appl. No.: 10/545,174

(22) PCT Filed: Feb. 11, 2004

(86) PCT No.: PCT/AU2004/000158

§ 371 (c)(1),
(2), (4) Date: Nov. 16, 2005

(87) PCT Pub. No.: WO2004/072212

PCT Pub. Date: Aug. 26, 2004

(65) Prior Publication Data

US 2006/0112617 A1 Jun. 1, 2006

Related U.S. Application Data

(60) Provisional application No. 60/446,267, filed on Feb. 11, 2003.

(51) Int. Cl.
F26B 5/04 (2006.01)
(52) U.S. Cl. .......................................... 44/596; 34/402

(58) Field of Classification Search .................. 44/491, 44/550, 596; 264/101, 109, 29.3, 117, 122, 264/118; 34/363, 365, 402; 452/9
See application file for complete search history.

(56) References Cited

U.S. PATENT DOCUMENTS

| 1,453,988 A | | 5/1923 | Mueller |
| 2,729,855 A | * | 1/1956 | Titus et al. .................. 264/109 |
| 2,937,080 A | | 5/1960 | Komarek et al. |

(Continued)

FOREIGN PATENT DOCUMENTS

GB 1 545 255 5/1979

(Continued)

OTHER PUBLICATIONS

International Search Report of PCT/AU2004/000158, mailed Apr. 2, 2004.

(Continued)

*Primary Examiner*—Michael A Marcheschi
*Assistant Examiner*—Chantel Graham
(74) *Attorney, Agent, or Firm*—Nixon & Vanderhye P.C.

(57) ABSTRACT

A process and system is provided for briquetting particulate matter such as moisture-containing bituminous and sub-bituminous coal. This process includes partially drying the particulate matter and feeding, the partially dried particulate matter to a briquetting apparatus under conditions such that water vapor is released from the particulate matter during feeding. The particulate matter is passed through briquette forming rollers to form briquettes. The released water vapor substantially displaces or prevents the ingress of a large proportion of other gaseous components from the atmosphere surrounding and/or intermixed with the particulate matter. The particulate matter that is fed to the briquetting apparatus is surrounded by and intermixed with a gaseous component containing 70 to 100% by volume of water vapor at the point where it enters the briquette-forming part of the briquetting apparatus.

14 Claims, 4 Drawing Sheets

U.S. PATENT DOCUMENTS

| | | | |
|---|---|---|---|
| 3,800,428 A | | 4/1974 | Ahland et al. |
| 4,093,455 A | | 6/1978 | Pietsch |
| 4,187,079 A | | 2/1980 | Weber et al. |
| 4,248,603 A | | 2/1981 | Weber et al. |
| 4,401,436 A | | 8/1983 | Bonnecaze |
| 4,683,814 A | | 8/1987 | Plovanich et al. |
| 4,702,745 A | | 10/1987 | Kamei et al. |
| 4,810,258 A | | 3/1989 | Greene |
| 5,046,265 A | * | 9/1991 | Kalb ........................... 34/402 |
| 5,066,441 A | * | 11/1991 | Gerard ....................... 264/118 |
| 5,067,968 A | | 11/1991 | Davidson et al. |
| 5,154,662 A | * | 10/1992 | Moritz et al. .................. 452/9 |
| 5,361,513 A | * | 11/1994 | Woessner ................... 34/363 |
| 5,518,675 A | * | 5/1996 | Sims ........................... 264/122 |
| 6,375,690 B1 | | 4/2002 | Gunnink et al. |

FOREIGN PATENT DOCUMENTS

| | | |
|---|---|---|
| GB | 2 063 298 A | 6/1981 |
| JP | 57-39680 B2 | 8/1982 |
| JP | 57-179294 A | 11/1982 |
| JP | 58-21948 B2 | 5/1983 |
| JP | 61-64327 A | 4/1986 |
| WO | 90/10052 A1 | 7/1990 |

OTHER PUBLICATIONS

Supplementary European Search Report mailed Dec. 17, 2009 in European Application No. 04709957.7.

Notification of Reason for Refusal issued on Mar. 11, 2009 in Japanese Application No. 2006-501355, with English translation.

International Preliminary Examination Report completed Feb. 4, 2005 in International Application No. PCT/AU2004/000158.

Examiner's First Report issued in Australian Application No. 2004210881 on May 29, 2008.

* cited by examiner

BRIQUETTING PROCESS

This application is the US national phase of international application PCT/AU2004/000158, filed 11 Feb. 2004, which designated the U.S. and claims benefit of U.S. Provisional Application No. 60/446,267, dated 11 Feb. 2003, the entire contents of each of which are hereby incorporated by reference.

FIELD OF THE INVENTION

The present invention relates to a process and system for briquetting materials, especially but not limited to those that contain moisture. The present invention is especially suitable for briquetting organic materials that contain moisture, such as peat, lignite, brown coal, sub-bituminous coal, bituminous coal and anthracite.

BACKGROUND OF THE INVENTION

The present invention is particularly suited to briquetting organic material containing moisture, such as peat, lignite, brown coal, sub-bituminous coal and bituminous coal. The present invention is especially suited to briquetting sub-bituminous and bituminous coals and, for convenience and ease of description, the invention will be described with reference to the briquetting of sub-bituminous and bituminous coals. However, it will be understood that the invention is not limited to briquetting bituminous and sub-bituminous coals and that the invention may be used to briquette other organic or inorganic materials, and indeed any other materials that may or may not contain moisture.

Sub-bituminous coals have relatively high moisture levels (up to 35% moisture, by weight). Not only does this reduce the calorific value of the coal, it almost completely excludes sub-bituminous coals from export markets due to the poor economics associated with transporting the very high moisture levels associated with those coals. Removal of this moisture requires a thermal drying stage due to the chemically combined nature of most of the water in sub-bituminous coals. However, removal of the water causes further problems that prevent greater acceptability and use of such coals. In particular, once dried, the sub-bituminous coals suffer serious spontaneous combustion problems and considerable size degradation. Consequently, the drying process tends to increase the quantity of fines associated with the coals.

Bituminous coals are higher rank coals that have a higher calorific value and lower inherent moisture content than sub-bituminous coals. Although more amenable to transport than sub-bituminous coals, bituminous coals can suffer from production of excessive fines during mining, washing and handling operations. Such fines are difficult to use and represent a loss of product. Free surface moisture also causes difficulties with fine bituminous coals and can be as high as 25% by weight. This causes problems because it reduces the available energy content of the coal and can have a serious impact on the handling properties of the coal.

With many metallurgical and higher ranks steam coal, the grindability of the coal is such that the percentage of fine material in the total cleaned coal is sufficient to result in marketing difficulties even if the moisture content is reduced to an otherwise acceptable value. A possible solution to overcome this difficulty involves briquetting of the coal to form larger particles of the coal. However, the briquetting solution must provide for restructuring of the fines into a commercially attractive, handleable and durable form whilst not increasing production costs beyond the threshold of overall profitability.

Briquetting of coal has been carried out since the late 19th century. The traditional approach to coal briquetting involved mixing the coal particles with binders to bind the coal particles together into a larger mass. Binders that have been tried include organic binders such as coal-tar pitch, petroleum bitumen and asphalt, wood tar, synthetic and natural resins, starch, sulphite liquors, sugars and molasses, cellulose compounds, vegetable pulps, alginates, glue or gum, albumates, casein, peat, lignite and wood. Inorganic binders that have been used include cement, clay, lime, magnesia, gypsum, sodium or other alkali silicates. Compound binders comprising blends of two or more of the above have also been tried.

The criteria by which binders used in briquetting of coal have been judged include:
type of coal being briquetted
briquette strength and handling properties
moisture and weather resistance
combustion characteristics
effect on the physical properties of the coal
physical integrity of the briquette during combustion
toxicity of the binder or its de-composition and combustion products
cost of the binder
processing costs for the use of the binder, such as blending and curing.

Experience with coal briquettes that incorporate binders has shown that a generally applicable coal binder that meets all of the above criteria has not yet been found. For example, pitch, bitumen and asphalt give adequate strength and moisture resistance but result in smoking combustion, toxicity problems, change to coking properties, high cost and high processing costs. Starch provides good strength and clean burning but is expensive and has poor weathering resistance. Sulphate liquor binders burn with little smoke but produce toxic sulphur dioxide emissions and have poor weathering properties. Sugars, particular molasses, have inferior moisture and weathering resistance and may suffer mould growth during storage. Cellulose-type binders typically suffer from low strength and rapid deterioration, with the briquettes tending to disintegrate in the early stages of combustion. It has been reported that the inorganic binders all suffer relatively low strengths, poor weathering resistance and high ash levels after combustion.

The necessity to add the binder component to the briquette also unavoidably increases the complexity and cost of briquette production.

In order to try to avoid some of the difficulties involved with producing briquettes using binders, various attempts have been made to produce binderless briquettes. For example, U.S. Pat. No. 2,937,080 in the name of Komarek et al describes a process for briquetting coal by feeding coal particles into a hot gas stream in a flash dryer. The coal particles are entrained by the gas stream and are heated by the gas stream to cause water to evaporate from the coal. The coal particles are transported by the gas stream to a cyclone separator, where the hot, dried coal particles are separated from the gas stream. The separated coal particles drop into a hopper and pass through the rolls of a briquetting apparatus to form the briquettes. This patent states that the temperature of the coal just before it reaches the briquetting machine should be just below the softening point, e.g. of nascent plasticity, of the coal for maximum efficiency and operation. The patent further stated that many coals can be compressed into suitable agglomerates within the temperature range of about 300 to 700° F. (about 149 to 371° C.).

U.S. Pat. No. 5,046,265 in the name of Kalb describes an integrated process for drying and briquetting sub-bituminous coals. In this process, coal is dried in a flash dryer under conditions that promote degradation of the coal particles. In particular, the coal particles are fed to a hot gas stream in a flash dryer and the thermal shock of the particles entering the hot gas stream causes degradation of the coal particles. The thus-treated coal particles are then separated from the gas stream by a series of cyclones. The separated gas is at least partially recycled to the flash dryer. The dried coal particles are fed to degasification/pre-compaction augers that compress the coal and remove gas therefrom before it is fed to the briquetting machine. In this regard, it will be appreciated that the dried coal particles have gas filling the interstitial spaces between the particles of coal and that the pre-compaction augers compress the coal and reduce the interstitial volume, thereby driving gas out of the coal. The gas liberated from the coal by the pre-compaction augers is treated by a small volume fan and dust collector. The pre-compacted coal is subsequently fed to a briquetting machine.

U.S. Pat. No. 5,046,265 specifies seven parameters as being critical to the briquetting process, these being:

1 The temperature of the material—water resistance and overall briquette quality were noted to improve significantly as temperature is increased from ambient to about 160 to 180° F. (71-82° C.). It has been also noted, however, that briquette quality began to decline if the material was heated to a temperature in excess of 220° F. (104° C.).

2 Feed size consistency.

3 Degasification and pre-compacting.

4 Compressive pressure.

5 Maintenance of an oxygen deficient atmosphere—The patent states it is known and demonstrated fact that sub-bituminous coal fines which have been thermally dried to moisture contents in the range of 10% or less (substantially below the inherent moisture content of undried sub-bituminous coal materials but above the preferred levels of 4-5% achievable by the present invention) are highly susceptible to rapid spontaneous ignition approaching spontaneous explosion when exposed to normal atmospheric concentrates of oxygen, even at ambient temperature conditions. For this reason, it is necessary that the entire portion of the process system containing the hot and dry fine coal must be maintained under inert (oxygen deficient) conditions. In this patent, the entire system is maintained under an inert gas environment via controlled "leakage" of inert gas from the dryer.

6 Cooling of the briquetted product.

7 Maintaining minimum quantities of combustion ash materials in the feed to the briquetting system.

The overall process system described in U.S. Pat. No. 5,046,265 is stated as being able to convert high inherent moisture (30-35%), low BTU value (8,200 to 8,800 BTUs per pound), sub-bituminous coals, and the like into a high BTU (11,000 to 11,500 BTU per pound), low moisture (approximately 5-8%) product which at the same time has acceptable handleability characteristics in the context of the current market place and user infrastructure system.

International patent application no. PCT/CA90/00056 (International Publication no. WO90/10052) describes a briquetting process for briquetting bituminous coals without the use of extraneous binders. This system uses high temperature, high pressure mould forming of the coal fines material in an apparatus incorporating a high pressure roll-type briquetting press. The system incorporates a positive pressure, controlled oxygen, gas re-circulation flash dryer and a direct briquette product to feed a heat exchange system for high system efficiency.

SUMMARY OF INVENTION

In a first aspect, the present invention provides a process for briquetting particulate matter containing moisture comprising the steps of partially drying the particulate matter, feeding the partially dried particulate matter to a briquetting apparatus under conditions such that water vapour is released from the particulate matter during feeding and passing the particulate matter through the briquetting apparatus to form briquettes.

The term "feeding the partially dried particulate material to the briquetting apparatus" encompasses the steps involved in transferring the partially dried particulate matter from when it is separated from the dryer gas stream to when it enters the briquetting apparatus. It may include transfer through conduits or chutes, short term storage in a hopper or vessel and final feeding to the briquetting apparatus.

Preferably, the partially dried particulate matter is fed to the briquetting apparatus under conditions such that water vapour is released from the particulate matter whereby the released water vapour substantially displaces and/or prevents the ingress of a large proportion of other gaseous components from the atmosphere surrounding and/or intermixed with the particulate matter. More preferably, the particulate matter that is fed to the briquetting apparatus is surrounded by and/or intermixed with a gaseous component containing from 70-100% by volume water vapour at the point where it enters the briquette-forming part of the briquetting apparatus. As a result, when the particulate matter is compressed during briquette formation, the water vapour condenses or liquefies and the pressure buildup of gaseous material in the thus-formed briquette is minimised. The present inventors have also discovered that previous difficulties caused by the presence of large proportions of non-condensable gases mixed with the particulate matter (which include blow-back of the gases through the particulate feed material which can disrupt the flow of particulate matter to the briquetting apparatus, explosive break-up of the briquettes as they are removed from the briquetting apparatus and porous briquettes of diminished strength) are minimised or avoided in the present invention.

In a second aspect, the invention provides a process for briquetting particulate matter including:
  feeding particulate matter to a briquetting apparatus;
  introducing a condensable gas into the briquetting apparatus during feeding, and
  forming briquettes in a briquette forming part of the briquetting apparatus, wherein briquettes are formed from the particulate matter under conditions of temperature and pressure which cause the condensable gas to condense, thereby reducing gas pressure buildup of gaseous components during briquette formation.

The invention extends to a system for briquetting particulate matter including:
  a briquetting apparatus;
  means for feeding particulate matter to the briquetting apparatus;
  means for introducing a condensable gas into the briquetting apparatus, wherein the briquette forming apparatus includes a briquette forming part in which briquettes are formed from the particulate matter under conditions of temperature and pressure which cause the condensable gas to condense during briquette formation, thereby reducing the gas pressure buildup.

Whilst water vapour is the most common condensable gas that is used, other condensable gases such as freon may also be used in cases where the particulate matter is more temperature sensitive or moisture sensitive. By the term 'condensable gas' is meant any gas that will tend to condense during the briquette forming process.

The method of the present invention may be used for the briquetting of organic and inorganic materials, as well as materials such as sludges which are partly organic and partly inorganic. Examples of inorganic materials include magnesium and calcium oxides, alumina and red mud. The method and system is particularly suitable for the briquetting of organic materials, such as wood dust, vegetable matter, peat, brown coal lignite, sub-bituminous coal and bituminous coals. The method of the present invention is especially suitable for briquetting brown coals, lignite, sub-bituminous and bituminous coals.

The method of the present invention involves the step of partially drying the particulate matter. It is preferred that the step of partially drying the particulate matter takes place in a flash dryer, and in particular a gas recycle flash dryer. In the process the particulate matter is injected into a hot gas stream flowing through a conduit. The particulate matter is entrained by the hot gas stream which causes the temperature of the particulate matter to be increased. This commences the drying process. The gas stream with entrained particulate matter then passes through one or more cyclones in which the particulate matter is separated from the gas stream.

The separated gas stream leaving the cyclone or cyclones is partially recycled to the gas recycle flash dryer with the excess gas being vented. The vented portion of the gas stream preferably passes through a baghouse or any other suitable device for removing fines that pass with the gas stream through the cyclones.

The portion of the gas stream that is recycled to the gas recycle flash dryer suitably passes through a fan, compressor or the like and a gas heater or furnace, which again increases the temperature of the gas stream prior to injection of the particulate matter into the flash dryer. The amount of gas that is vented through the baghouse corresponds largely to the volume of combustion product gas generated in the gas heater together with the volume of non-condensed water vapour driven off from the particulate matter within the system. The particulate matter recovered from the separating cyclone is in a partially dried state. By "partially dried", it is meant that the moisture content of the particulate matter has been reduced from the moisture content of the feed particulate matter, but that further moisture can be removed therefrom.

The partially dried particulate matter is then transferred and fed to the briquetting apparatus. The transfer and feeding of the particulate matter from the cyclones to the briquetting apparatus may take place using any apparatus known by the person skilled in the art to be suitable for transferring particulate matter. Some examples include augers, conveyer systems and pneumatic conveyers.

It is a feature of the first aspect of the present invention that further drying of the partially dried particulate matter takes place during feeding of the particulate matter to the briquetting apparatus. As will be readily understood by the person of skill in the art, further drying of the particulate matter during feeding to the briquetting apparatus causes the release of moisture from the particulate matter. The moisture is released in the form of water vapour and the water vapour acts to displace non-condensable gases, such as nitrogen, carbon dioxide and other gases from the atmosphere that surrounds or intermixes with the particulate matter. As a result, the gaseous component of the mixture of particulate matter and gas that is fed to the briquetting apparatus has a high level of water vapour. It will be appreciated that water vapour is a condensable gas and that the pressure applied to the particulate matter during the briquetting process can cause the water vapour to liquefy, thereby greatly reducing the volume of the gaseous components that pass through the briquetting apparatus. This assists in preventing blow-back of gases through the particulate matter being fed to the briquetting apparatus, as well as improving the quality of the briquettes thus formed by minimising porosity caused by trapped non-condensable gases and possible explosive breakdown of briquettes caused by pockets of compressed non-condensable gases trapped inside the briquettes.

According to a still further aspect of the invention there is provided a system for briquetting particulate matter containing moisture including:

a briquetting apparatus having a briquette forming part;

means for partially drying the particulate matter;

means for feeding the partially dried particulate matter to the briquetting apparatus, and means for creating conditions such that water vapour is released from the particulate matter during feeding.

The briquetting apparatus is suitably of the kind that includes briquetting rollers. In briquetting apparatus of this kind, the particulate matter is fed to the rollers. The rollers compress the particulate matter. One or more of the rollers preferably has pockets formed therein, which pockets assist in defining the shape of the briquettes. The rollers also apply an amount of shear to the particulate matter as it passes through the briquetting apparatus. It is believed that applying shear as well as compression is important in forming briquettes from certain feed materials such as bituminous coals and sub-bituminous coals.

In order to assist in feeding the particulate matter to the briquetting apparatus or briquetting rollers, it is preferred that one or more feed augers are used to feed the particulate matter. The feed augers are beneficial as they precompact the particulate matter, reduce voidage, and ensure a consistent supply of particulate matter to the briquetting apparatus. Moreover, the feed augers generate a more tortuous path for escaping gas displaced from between the particles during compaction which also assists in minimising or avoiding blow-back of gases through the particulate matter being fed to the briquetting apparatus.

In a preferred embodiment of the present invention, the particulate matter is fed to the rollers of the briquetting apparatus in an essentially horizontal direction.

The present inventors have also found that the relationship between roll size and briquette pocket width to roll diameter is quite important in forming briquettes, especially when forming briquettes from brown sub-bituminous or bituminous coals. Therefore, in a second aspect, the present invention provides a process for briquetting particulate material in which the particulate material is fed to a briquetting apparatus including two or more rollers through which the particulate material passes, at least one of said rollers including one or more briquetting pockets, characterised in that the diameter of the rollers ranges from 100 mm to 600 mm and the ratio of the briquette pocket width to roll diameter falls within the range of 0.05 to 0.15.

In a preferred embodiment of the second aspect of the present invention, the roll diameters fall within the range of 400 mm to 550 mm and the ratio of the briquette pocket width to roll diameter is about 0.08.

In an especially preferred embodiment, the method of the second aspect of the present-invention is used in conjunction with the method of the first aspect of the present invention.

DETAILED DESCRIPTION OF THE EMBODIMENTS

In order to more fully explain the present invention, an embodiment of the invention will now be described with reference to FIG. 1, which shows schematic flow diagram of a process for forming briquettes from bituminous coals or sub-bituminous coals. Although the process shown in FIG. 1 is intended for use in bituminous or sub-bituminous coals, it will be appreciated that the process of the first and second aspects of the present invention may be used to form briquettes from other particulate material.

Figure 1:
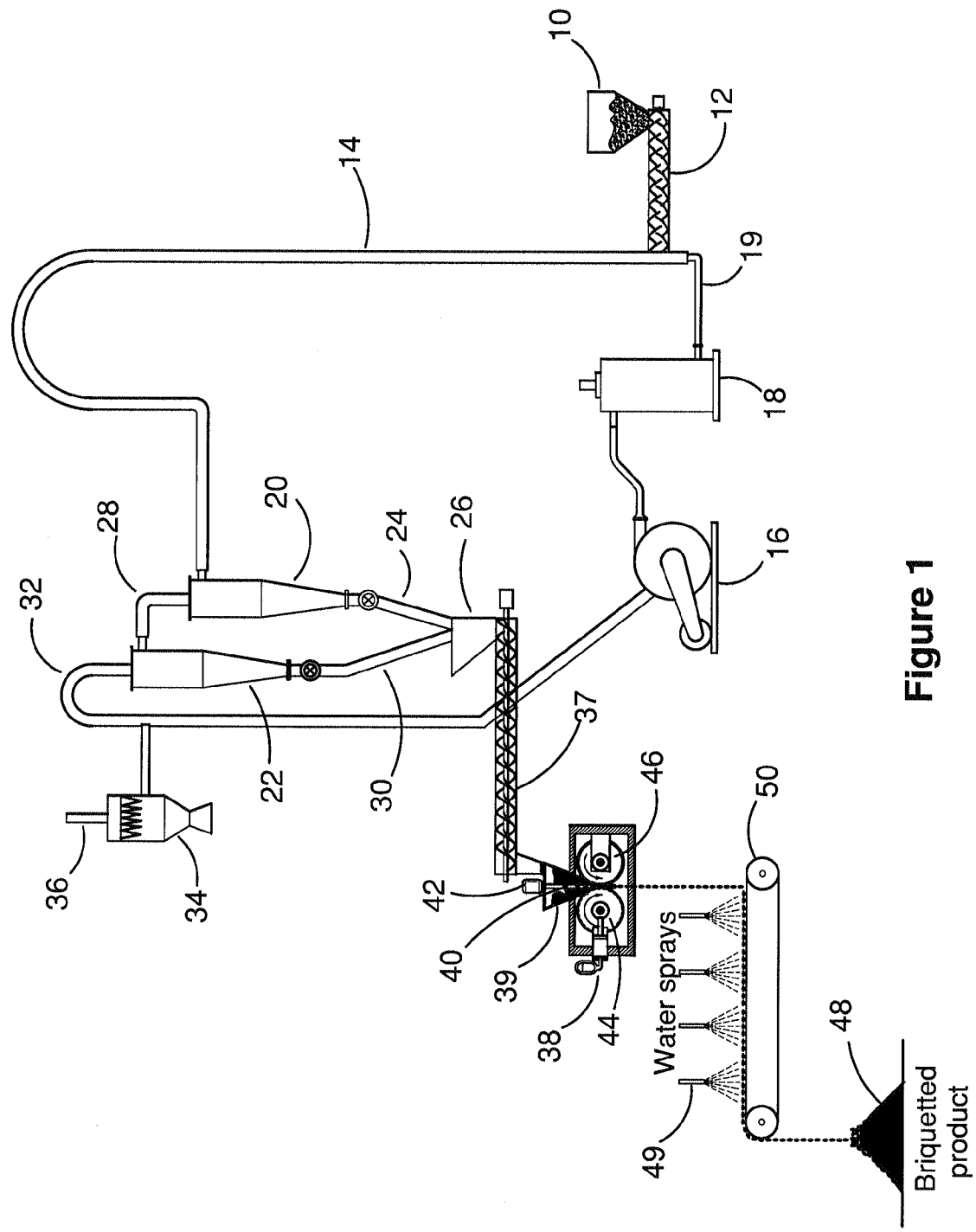
FIG. 1 shows a schematic flow diagram of a process and system for forming briquettes from bituminous coals or sub-bituminous coals.

In the flow diagram shown in FIG. 1, moist coal is fed from a moist coal hopper 10 through an auger conveyer 12 into a flash heater riser tube 14. A hot gas stream passes through flash heater riser tube 14. The hot gas stream is generated by passing gas from a fan 16 through a gas heater 18 into the flash heater riser tube 14.

When the moist coal feed is fed into the flash heater riser tube 14, the coal is entrained in the gas stream. As the gas is hot, the temperature of the coal increases and this causes some of the moisture contained in the coal to be converted to water vapour.

The gas stream and entrained coal are then fed to separating cyclones 20, 22. First cyclone 20 separates large fractions of the coal from the gas stream. The separated larger fraction of coal passes through conduit 24 into a collection hopper 26. The gas leaving first cyclone 20 passes through a conduit 28 and into second cyclone 22. In second cyclone 22, finer particles of coal are separated from the gas. The finer particles of coal travel through conduit 30 and into collection hopper 26. Some of the finer coal may also be fed to the heater 18 as a fuel.

The gas leaving second cyclone 22 passes through conduit 32. A portion of the gas travelling through conduit 32 is vented via baghouse 34 and vent 36. The remaining portion of gas is recycled via fan 16 and gas heater 18 to the flash heating riser tube 14.

As a portion of the gas stream in the flash dryer or heating riser tube is recirculated, it will be appreciated that the gas stream in the flash dryer has a significant quantity of water vapour therein. Furthermore, the quantity of water vapour in the gas stream will increase following injection of the moist coal into the gas stream because water will be removed from the moist coal in the gas stream. The presence of significant quantities of water vapour in the gas stream circulating through the flash dryer 14 and careful control of other constituents of the gas stream, especially its oxygen content, can ensure that the danger of explosion within the flash dryer is minimised or avoided.

It will also be appreciated that combustion product gas added at gas heater 18, together with the water vapour generated from the product drying displaces gas through vent 36 in order to maintain constant system pressures. The amount of gas vented through vent 36 is equivalent to the amount of combustion gas injected at the gas heater 18 plus the water vapour generated from the drying of the particulate matter.

The partially dried coal that is collected in collection hopper 26 is then fed by a feed auger 37 to briquetting apparatus 38. The partially dried coal passes from feed auger 37 into feed hopper 39 under conditions such that water vapour continues to be released from the coal. This further reduces the moisture content of the coal and also results in the released water vapour displacing non-condensable gases, such as nitrogen, carbon dioxide and other gases, particularly from the environment of the feed hopper 39. As a result, the amount of non-condensable gases intermixed with the coal being fed to the briquetting apparatus 38 is reduced and the amount of water vapour in the gaseous atmosphere intermixed with the coal is increased. Preferably, the gaseous atmosphere comprises 70% to 100% and more preferably 80% to 100% by volume $H_2O$ at this point. In a situation where the gaseous atmosphere is not sufficiently saturated, supplemental water vapour can be introduced directly into the briquetting apparatus 38 into the feed hopper 39 or 39A.

Figure 1A:
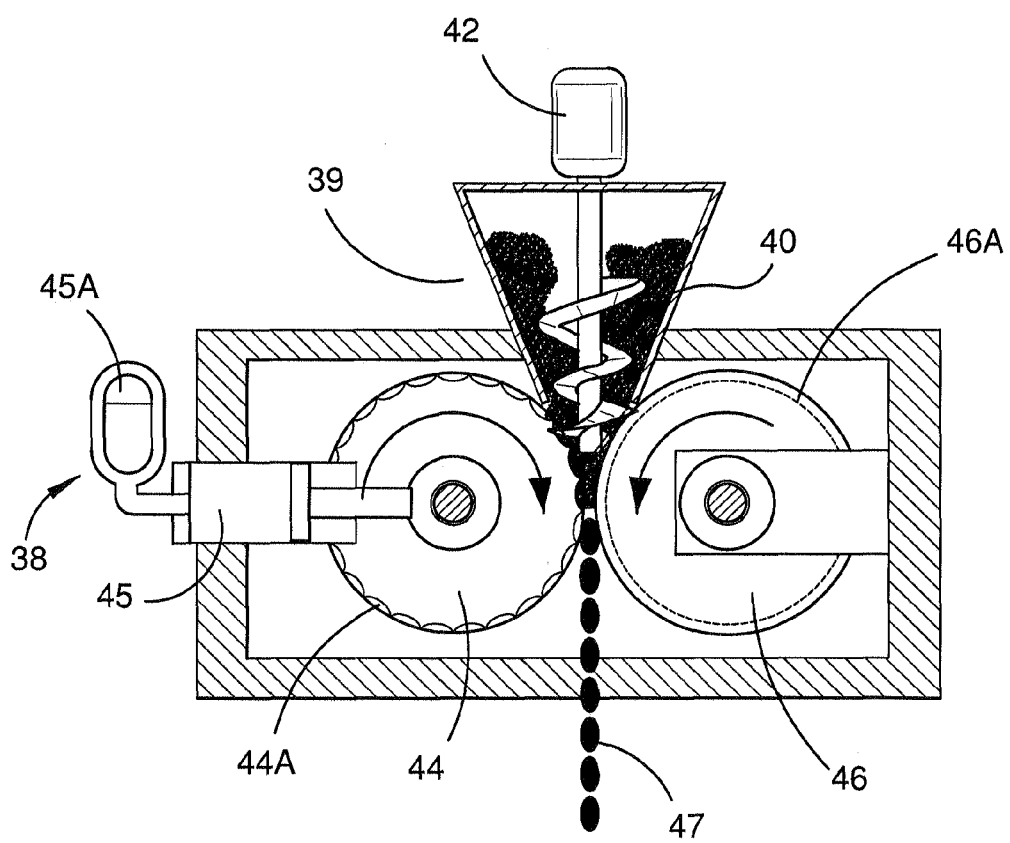
FIG. 1A shows a more detailed schematic cross-sectional side view of a briquette forming part of the briquette forming apparatus of FIG. 1.

As can more clearly be seen in FIG. 1A, feed hopper 39 is fitted with an auger 40 driven by auger motor 42. Auger 40 ensures that the coal is positively fed to the briquetting apparatus. Auger 40 partially compacts the coal before it is compacted by the briquetting rolls.

The briquetting apparatus 38 is provided with two rollers 44, 46. One of the rollers 44 has briquetting pockets 44A formed therein, and the other roller is preferably smooth, as is shown at 46A, but may also be provided with pockets. As the coal passes through the rollers, it is compressed and subjected to shear. The amount of shear that is applied can be varied by virtue of the differential speed between the two rollers. Typically, the rollers are rotated at speeds from 20 rpm to 100 rpm, and preferably from 80 to 90 rpm. The speed differential between the two rollers is typically between +10% and –10%. The roller 44 is mounted on an hydraulic ram 45 which is fitted with an accumulator having a gas spring 45A providing a compressive force at the nip between the rollers for compressing both the coal particles and the gaseous atmosphere that is intermixed with and surrounds the coal particles. As this gaseous atmosphere contains a substantial proportion of water vapour, the water vapour liquefies as a result of the compression. This greatly reduces the gas pressure increase during compression. It will be appreciated that if the gaseous atmosphere intermixed with the coal contained a greater proportion of non-condensable gases, the pressure-limiting condensation effect would be reduced. The pressure build-up in the gases would thus be greater resulting in gases trying to escape during compression in the briquetting apparatus by flowing back towards the feed hopper 39. This would tend to result in blow-back of the gases which interrupts the feed of coal to the briquetting apparatus. Alternatively, or in addition, the non-condensable gases could be compressed into pockets of compressed gas contained within the briquettes. When the briquettes 47 are released from the rollers 44, 46 the applied external pressure on the briquettes is released. As a result, pockets of compressed gas could potentially cause the briquettes to explode. Therefore, the present invention represents a significant advance over prior art processes known to the present inventors.

Figure 2:
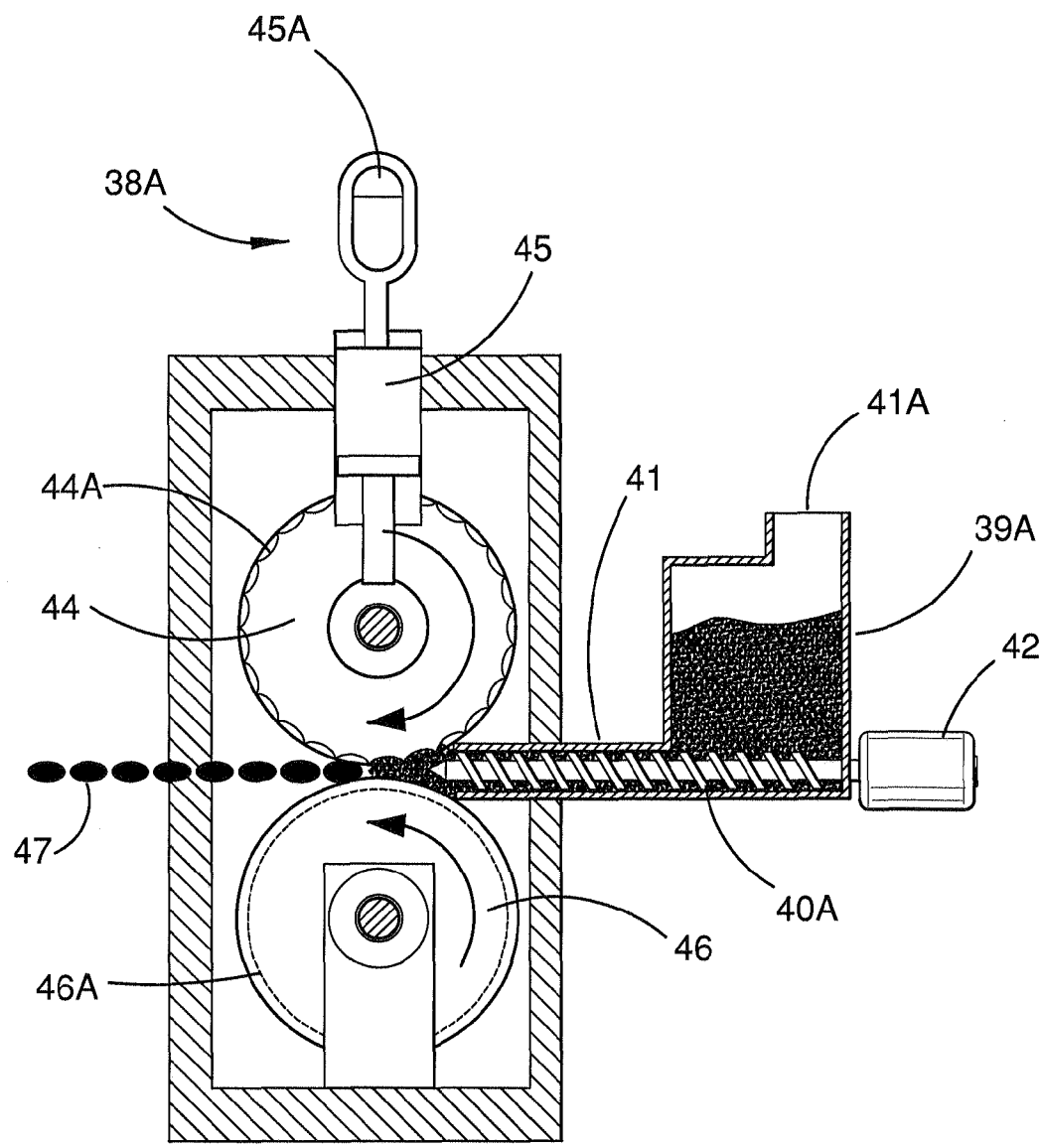
FIG. 2 shows a schematic cross-sectional side view of a second embodiment of a briquette forming part of a briquette forming apparatus of the invention.

Although the embodiment shown in FIGS. 1 and 1A shows the coal being fed to briquetting apparatus 38 moving in an essentially downwardly vertical direction, another preferred embodiment of the present invention illustrated in FIG. 2 provides for the coal moving in an essentially horizontal direction as it is fed to the briquetting rollers. In FIG. 2, a feed hopper 39A is fitted with a horizontally oriented auger 40A driven by auger motor 42. The auger feeds coal from the base of the hopper 39A through a horizontal auger pipe 41 to the nip between the rollers 44 and 46. Because the pipe 41 forms a relatively close fit with the auger, this serves to assist in building up the back pressure and reducing blowback owing to the tortuous path defined by the auger and the resultant precompaction of particulate matter within the auger. The upper opening 41A does not vent to atmosphere, but has a closed coupling to the feed auger 37 of FIG. 1. The system illustrated in FIG. 1 is generally a closed system, with only the baghouse vent 36 venting to atmosphere. This allows the entire system to operate under positive pressure relative to the surrounding atmosphere, with the gases escaping through the baghouse vent 36. Specific examples of the method of the present application for manufacturing briquettes from bituminous and sub-bituminous coal will now be described.

The coal is prepared for the process to a particle size range of between 0 mm and 5 mm either by screening, or milling. The temperature of the drying gas, before it is mixed with the moist feed coal is governed by the moisture of the feed coal and the solids loading the flash heating riser tube. Typically, the temperature of the gas stream at point 19 shown in FIG. 1 (i.e. before being mixed with the moist coal) is adjusted to give a final coal temperature as it leaves the dryer and enters collection hopper 26 of from 90° Celsius to 150° Celsius, more preferably from 105° Celsius to 110° Celsius. Typically, a dryer gas temperature at point 19 in FIG. 1 falls within the range of about 300° Celsius to 400° Celsius.

The composition of the gas within the dryer is also preferably carefully controlled. The gas stream preferably has a very low oxygen content (eg below 2%, more preferably 1% or less) and a significant water vapour proportion. Typical figures for the gas composition in the dryer are given in table 1 below.

|  | $H_2O$ vol. % | $CO_2$ vol. % | $N_2$ vol. % | $O_2$ vol. % |
| --- | --- | --- | --- | --- |
| Before coal added | 49 | 5 | 44 | 1 |
| At coal separation | 60 | 4 | 35 | 1 |

Figure 3:
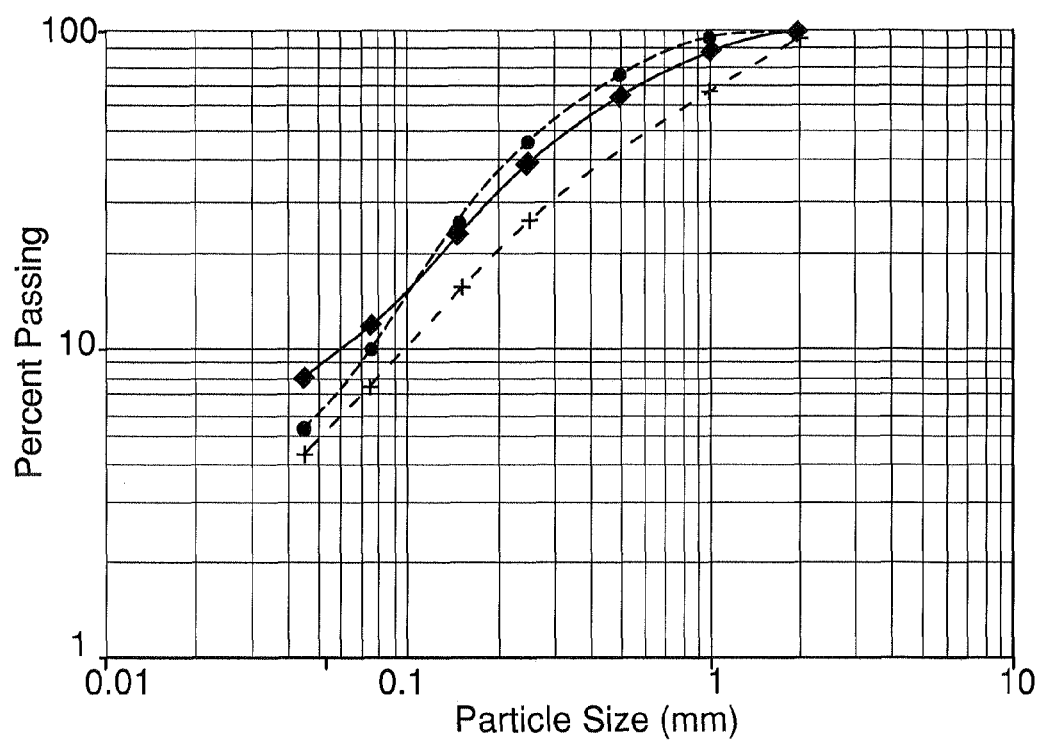
FIG. 3 shows a graph illustrating typical ranges of size distributions that have been briquetted using the process and apparatus of the present invention.

The particle size distribution of the feed coal that is fed in the method of the present invention can vary over a wide range. In practical terms, the limit on the upper size is determined by the maximum size of particle that can be easily dried and transported in the flash dryer, which would be 5 mm or more. Typical ranges of size distributions that have been successfully briquetted by the present inventors are shown in FIG. 3. In this Figure, the maximum particle sizes for all of the ranges are less than 3 mm.

The size distribution of the coal particles after drying is preferably virtually the same as before drying. There may be some degradation from thermal and mechanical effects during drying but these are usually seen as insignificant. In this aspect, the process of the present invention is different to U.S. Pat. No. 5,046,265 which deliberately caused thermal degradation of the larger coal lumps in the lower part of the dryer before they were entrained. It is believed that this approach has proved to be unsatisfactory.

The coal that is separated from the dryer and collected in collection hopper 26 is partially dried coal. As such, it still contains a level of moisture that can be removed by further drying. For bituminous coal, the moisture of the coal that is fed to the briquetter is preferably 0% to 3% above the coal's inherent moisture. This would mean a typically total moisture content for bituminous coal of between 1% and 10% by weight, more preferably between 1% and 8% by weight.

For sub-bituminous coals, the total moisture of the briquetter feed will be below the inherent moisture of the coal and typically will fall within the range of from 3% to 10% by weight. For sub-bituminous coal mined from the Collie Mine in Western Australia having an inherent moisture of 25 to 30% by weight, the optimum briquetter feed moisture content has been found to fall within the range of 5% to 7%.

Generally, the surfaces of the particles that are going to be bonded together should be essentially free of surface moisture and other foreign material.

An important feature of the process of the present invention is that the gas positioned between the coal particles after it has left the dryer, ie in the feed hopper 39 to the briquetter, contains 50 to 100% $H_2O$, more preferably 70 to 100% $H_2O$, and even more preferably 80 to 100% $H_2O$. This is achieved through ensuring that the coal leaving the dryer still has some moisture and is at a temperature greater than 80° Celsius. The coal continues to release water vapour as it sits in the briquetter feed hopper and this water vapour displaces the residual $N_2$, $CO_2$ and $O_2$. By ensuring that the gas filling the voids between the coal is predominantly water vapour, it is possible to avoid the problems of degassing when the coal powder is compacted.

It is particularly preferred that the gas filling the voids or interstitial spaces between the particles of coal as it enters the briquetter is a gas that can be condensed at pressures in the range of 100 to 200 kPa (absolute). It is specially preferred that the gas filling the voids between the particles of coals as it enters the briquetter comprises 50 to 100%, more preferably 70 to 100% and even more preferably 80 to 100% water vapour. The temperature is preferably in the range of 100 to 120°, and more preferably 105 to 110° C., which corresponds to a vapour pressure of 120 to 143 kPa (absolute).

The augers 40 and 40A that feed the coal to the briquetting apparatus act as precompactors. It is preferred that the precompactor provides a sufficiently tortuous path for escaping gas that the pressure of the vapour between the coal particles at the tip of the precompactor screw is 100 to 200 kPa (absolute) and more preferably 120 to 143 kPa, as was previously described.

It is preferred that the total power input to the briquetter rolls and the precompactor auger 46 should be in range of 15 to 30 kilowatt hours per tonne of coal.

The two opposed rollers 44, 46 have a diameter that is preferably within the range of 100 mm to 600 mm, with the preferred diameters of the rollers being between 400 mm and 550 mm. The ratio of the briquette pocket width to roll diameter should be in the range of from 0.05 to 0.15, with the preferred ratio being about 0.08.

The rollers preferably apply loadings within the range of 60 kN to 150 kN per centimetre of roll width, with a preferred loading of 115 to 130 kN per centimetre of roll width for a 460 mm diameter roll. Satisfactory briquettes from bituminous and sub-bituminous coals have been achieved using these roll compaction forces.

The briquetted product 47 must exit the process at a suitable temperature and moisture to reduce the likelihood of it undergoing spontaneous combustion. The product temperature should not be greater than 50° C. while it is in a stockpile 48, with a temperature of less than 40° C. being preferred. If the coal is dried below its equilibrium moisture it may tend to absorb moisture from the surrounding atmosphere which can result in the generation of significant amounts of heat (heat of absorption) which can raise the temperature of the briquette to a level where it could spontaneously combust. Consequently the briquetted product must be cooled to less than 50° C. while maintaining its moisture level close to its equilibrium moisture.

The temperature of the briquetted/compacted product as discharged from the briquetting press will be slightly higher than the temperature of the incoming hot dry fine coal feed as a result of the energy expended on the briquette by the high pressure briquetting process itself. While the exposed surface area of the material in the restructured form is vastly reduced over that of the feed material which advantageously results in a reduction in the propensity for it to undergo spontaneous ignition, it has nonetheless been demonstrated that some form of post-restructuring/briquetting cooling is necessary to prevent spontaneous combustion and to make the product handleable under normal production conditions.

Simply air cooling is not satisfactory as it also results in a reduction in the residual moisture level of the product which can have an adverse effect on the product's likelihood to spontaneously combust while in stockpiles.

As is seen in FIG. 1, this cooling is achieved by means of a system which applies a controlled quantity of water to the surface(s) of the freshly formed product 47 to reduce the temperature of this product by means of evaporative cooling. This cooling water will be applied to the briquettes by means of water spray heads 49 which are located above the product stream conveyor belt 50. The quantity of cooling water applied to the product is balanced with the total quantity of heat which must be removed in order to achieve the desired aggregate product stream temperature which will prohibit spontaneous combustion and provide handleability. The quantity of applied cooling water will be determined by both the temperature of the product, i.e. feed temperature to the press plus heat added as a result of compaction and the total quantity of product being produced as measured by a belt scale on the product belt 50. These two parameters are integrated, and thus control of the volume of spray water applied to the product by the water spray heads is such that cooling is efficiently achieved by evaporation rather than by inefficient saturation with excess water which results in reduced product quality, poorer handling and water effluent treatment requirements.

In a specific example for briquetting a sub-bituminous coal which has an inherent moisture of 25% to 30% in its raw form, the product briquette would need to have an equilibrium moisture level of around 9% to 11%. Consequently the product moisture should be 6% to 10% when cooled, preferably 7% to 9% at a temperature of less than 40° C.

The method of the present invention provides a means for forming briquettes from a large number of particulate materials. The first aspect of the present invention avoids problems associated with degassing in prior art briquetting processes. The second aspect of the present invention avoids scale up problems that have been encountered in scaling up laboratory size briquetting processes to an industrial scale. Both aspects provide binderless briquetting of particulate material.

Those skilled in the art will appreciate that the present invention may be susceptible to variations and modifications other than those specifically described. It is to be understood that the present invention encompasses all such variations and modifications that fall within its spirit and scope.

We claim:

1. A process for briquetting particulate matter including:
   partially drying the particulate matter;
   feeding the particulate matter to a briquetting apparatus under gas-forming conditions of temperature and pressure in which a condensable gas is released from the particulate matter during feeding, wherein the condensable gas is allowed to displace and/or prevent the ingress of other non-condensable gaseous components such that the particulate matter is surrounded by and/or intermixed with a gaseous component containing 70-100% by volume of the condensable gas; and
   forming briquettes in a briquette forming part of the briquetting apparatus, wherein briquettes are formed from the particulate matter under temperature and pressure conditions which cause the condensable gas to condense, thereby reducing gas pressure buildup during briquette formation and gas blow-back through the particulate matter being fed to the briquette forming part of the briquetting apparatus,
   wherein the process further includes using a precompacting auger to feed the partially dried particulate matter to the briquette forming part of the briquetting apparatus, and applying back pressure to said particulate matter using said precompacting auger and precompacted particulate matter to define a tortuous path to assist in further reducing blow-back of gases through the particulate matter being fed to the briquette forming part of the briquetting apparatus, and
   wherein the gas-forming temperature of the particulate matter ranges from 105° C. to 110° C. and the corresponding vapor pressure between the particles in the particulate matter at a tip of the precompacting auger ranges from 120 to 143 kPa (absolute).

2. The process of claim 1 wherein the condensable gas is allowed to displace and/or prevent the ingress of other non-condensable gaseous components such that the particulate matter is surrounded by and/or intermixed with a gaseous component containing 80-100% by volume of the condensable gas.

3. The process of claim 1 wherein further condensable gas is introduced separately into the briquetting apparatus.

4. The process of claim 1 in which the condensable gas is water vapour.

5. The process of claim 1 in which the particulate matter is chosen from a group consisting of organic materials including wood dust, peat, lignite, brown coal, anthracite and bituminous and sub-bituminous coals.

6. The process of claim 1 wherein the formed briquettes undergo evaporative cooling for preventing spontaneous combustion.

7. The process of claim 6 wherein evaporative cooling is achieved by a spray arrangement for lowering the temperature of the briquettes to below 50 ° C. and maintaining the moisture level close to the equilibrium moisture level of the briquettes.

8. The process of claim 1 wherein the step of partially drying the particulate matter takes place in a flash dryer, in which the particulate matter is injected into a hot gas stream flowing through a conduit, the particulate matter being entrained by the hot gas stream which causes the temperature of the particulate matter to be increased, and the gas stream with entrained particulate matter then passing through at least one cyclone in which the particulate matter is separated from the gas stream.

9. The process of claim 8 wherein the separated gas stream leaving the at least one cyclone is partially recycled to the flash dryer with the excess gas being vented, the vented portion of the gas stream passing through a particulate matter removing device for removing particulate matter that pass with the gas stream through the at least one cyclone.

10. The process of claim 9 wherein the portion of the gas stream that is recycled to the flash dryer is reheated prior to injection of the particulate matter into the flash dryer, with the amount of gas that is vented corresponding to the volume of combustion product gas and the volume of non-condensed water vapour driven off from the particulate matter.

11. The process of claim 1 in which the briquette forming part of the briquetting apparatus includes two or more rollers through which the particulate material passes, at least one of the rollers having pockets formed therein for assisting in defining the shape of the briquettes, the process including rotating the rollers at differing speeds for applying a predetermined amount of shear to the particulate matter as it passes between the rollers and is formed into briquettes.

12. The process of claim 11 wherein the diameters of the rollers range from 100 mm to 600 mm and the ratio of the briquette pocket width to roller diameter falls within the range of 0.05 to 0.15.

13. The process of claim 12 wherein the diameters of the rollers fall within the range of 400 mm to 550 mm and the ratio of the briquette pocket width to roller diameter is about 0.08.

14. The process of claim 11 in which the particulate matter is fed to the rollers of the briquetting apparatus in an essentially horizontal direction.

* * * * *